United States Patent

Hallman

[15] 3,666,658
[45] May 30, 1972

[54] HYDROPROCESSING PRODUCT SEPARATION

[72] Inventor: Newt M. Hallman, Mt. Prospect, Ill.
[73] Assignee: Universal Oil Products Company, Des Plaines, Ill.
[22] Filed: Nov. 23, 1970
[21] Appl. No.: 91,969

[52] U.S. Cl............................208/103, 208/102, 208/108
[51] Int. Cl. ......................................C10g 13/00, C10g 37/00
[58] Field of Search................................208/108, 102, 103

[56] References Cited

UNITED STATES PATENTS

| | | |
|---|---|---|
| 3,371,029 | 2/1968 | Weiland................................208/102 |
| 3,444,072 | 5/1969 | Lehman................................208/102 |
| 3,445,379 | 5/1969 | Hansen.................................208/107 |

Primary Examiner—Delbert E. Gantz
Assistant Examiner—G. E. Schmitkons
Attorney—James R. Hoatson, Jr. and Edward W. Remus

[57] ABSTRACT

Separation of the effluent from a high temperature high pressure hydroprocessing reaction by first separating the effluent in a high pressure, high temperature separator to produce a vapor phase (I) and liquid phase (I). Vapor phase (I) is cooled and separated at a high pressure to produce liquid phase (II) and hydrogen rich phase (II). Liquid phase (I) is cooled and separated at a high pressure to produce hydrogen rich phase (III) and liquid phase (III). Hydrogen rich phases (II) and (III) are of sufficient hydrogen purity for recycle to the reaction.

15 Claims, 1 Drawing Figure

Patented May 30, 1972
3,666,658
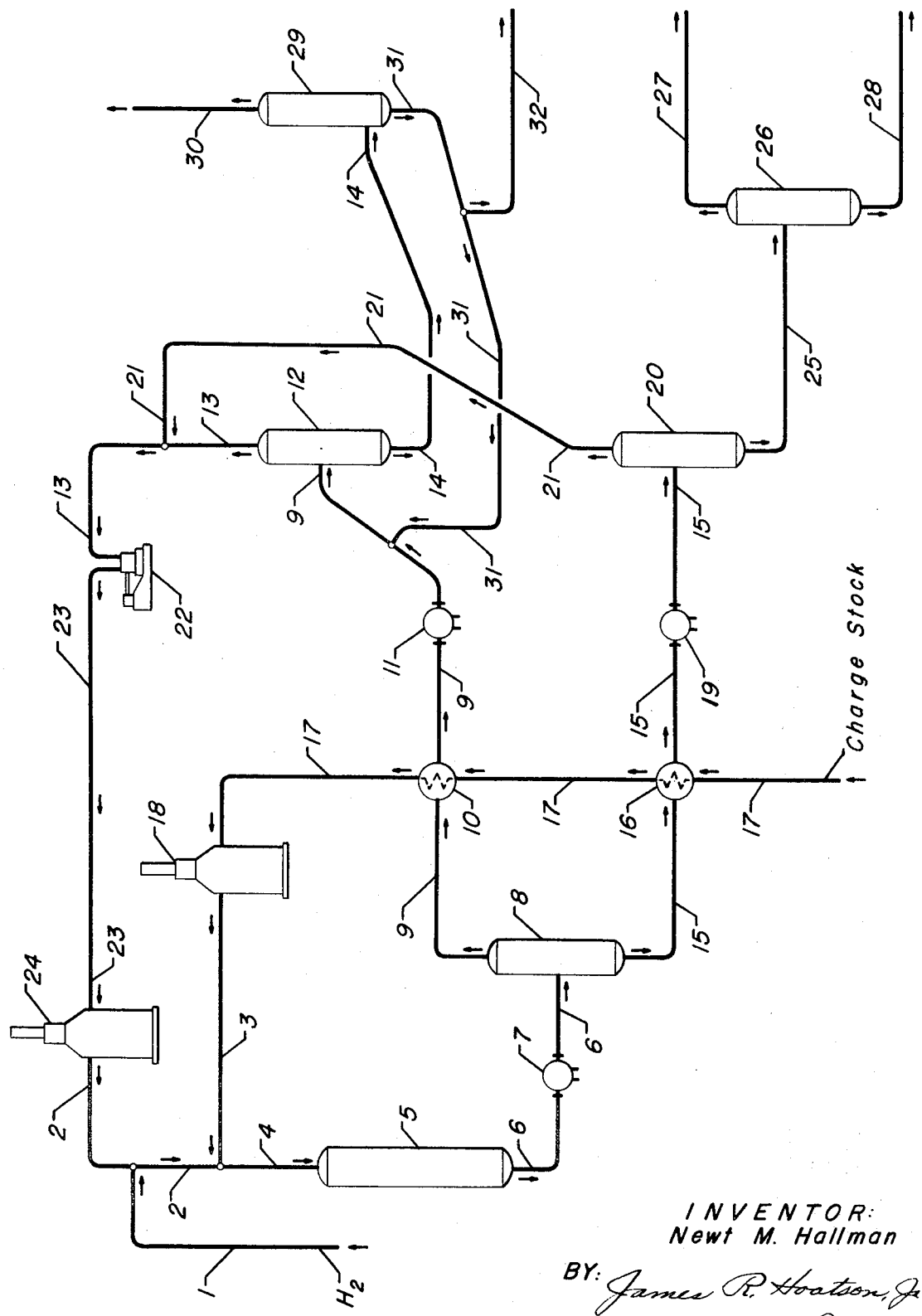
INVENTOR:
Newt M. Hallman
BY: James R. Hoatson, Jr.
Edward W. Remus
ATTORNEYS 3,666,658

HYDROPROCESSING PRODUCT SEPARATION

BACKGROUND OF THE INVENTION

The present invention relates to a process for separating the effluent from a high temperature, high pressure hydroprocessing reaction such as hydrocracking. More specifically, the present invention relates to a process for separating hydrogen of high purity from a high pressure, high temperature, hydroprocessing reaction effluent.

Hydroprocessing reactions such as hydrocracking, hydrotreating and hydrorefining have become important processes in the petroleum refining industry. For example, hydrocracking units where high molecular weight hydrocarbons are converted to lower boiling saturates suitable for fuel use, or hydrotreating units where undesirable sulfur and nitrogen containing contaminants are removed from a hydrocarbon feedstock, are contained in all modern refineries.

These hydroprocessing reactions are typically catalytic in nature and employ relatively pure hydrogen in considerable quantities at high temperature and high pressure reaction conditions. At the completion of a given reaction, a gas-liquid, mixed phase system containing hydrogen, normally gaseous compounds and normally liquid hydrocarbons, is present from which relatively pure hydrogen (i.e., typically 80 percent purity, by volume) must be separated for recycle to the reaction. This recycle of relatively pure hydrogen in maximum amounts and at high pressures is important since seldom is a refinery endowed with sufficient hydrogen (i.e., up to 50,000 SCF/BBL of feed processed) and compressor capacity to effect a hydroprocessing reaction on a once-through hydrogen basis. Thus, techniques have been developed by the art to separate and recover hydrogen from the reaction product effluent in relatively pure form and in maximum amounts, suitable for recycle to the hydroprocessing reaction. Relatively high purity recycle is required to avoid any deleterious side effects in the reaction and product contamination.

One of the more prevalent techniques of separating hydrogen from a mixed phase high temperature, high pressure hydroprocessing reaction effluent, such as hydrocracking, wherein the hydrogen is to be recycled, involves separating the effluent in a first separation zone under substantially the same pressure and temperature as the reaction to provide a vapor phase (I) and liquid phase (I). Vapor phase (I) is then cooled to a temperature of about 60° to 140° F. and the cooled vapor is separated in a second separation zone to provide a hydrogen rich vapor phase (II) and a liquid phase (II). To maintain hydrogen purity, liquid phase (II) is further separated at a substantially reduced pressure and at least a portion of the resultant liquid is recycled back to the second separation zone. Liquid phase (I) is separated in a third separation zone at substantially the same temperature as the first separation zone but at a substantially reduced pressure to provide liquid phase (III) and vapor phase (III). This vapor phase (III) is then cooled and combined with liquid phase (II) and separated in a fourth separation zone at a temperature of about 60° to 140° F. to provide vapor phase (IV) and liquid phase (IV). Typically the only hydrogen present in the original reaction effluent which is separated and recycled back to the reaction is that recovered in vapor phase (II). However, liquid phase (I) contains appreciable amounts of hydrogen in solution which are removed from the process in vapor phase (IV) in admixture with normally gaseous hydrocarbons such as methane, ethane and propane and other gaseous compounds formed by impurities in the feedstock such as ammonia and hydrogen sulfide. This hydrogen in vapor phase (IV) is at a substantially reduced pressure and must be extensively recompressed to be recycled back to the reaction zone. In addition, this stream is usually treated, prior to recompression, to upgrade its purity. Often, vapor phase (IV) is vented or burned as fuel and the chemical value of the hydrogen is lost. This typical prior art separation process is illustrated by Weiland, U.S. Pat. No. 3,371,029.

SUMMARY OF THE INVENTION

It is an object of the present invention to provide a process for the separation of a gas-liquid, mixed phase system produced in a high temperature, high pressure hydroprocessing reaction zone.

More particularly, it is an object of the present invention to provide a process for the separation of a gas-liquid, mixed phase system from a high pressure, high temperature hydroprocessing reaction to provide a maximum amount of high pressure, high purity hydrogen suitable for recycle to a hydroprocessing reaction zone.

It has been discovered that by cooling the liquid produced in the high pressure, high temperature separation zone employed in a typical high temperature, high pressure hydroprocessing scheme, (i.e., U.S. Pat. No. 3,371,029) at relatively the same high pressure, a high purity hydrogen phase suitable for recycle, or other use, without the need for extensive recompression is provided. This result is obtainable since hydrogen is more soluble in most hydrocarbons, and particularly 400+° F. boiling petroleum fractions, at high temperatures than at low temperatures. This is exactly opposite to the solubility of most gases in liquids where, generally, solubility is inversely proportional to temperature.

In an embodiment, therefore, the inventive concept described herein provides a process for separating the effluent from a high temperature, high pressure hydroprocessing reaction zone, resulting from the conversion of a hydrocarbon charge stock. This product effluent is characterized as a gas-liquid, mixed phase system containing hydrogen, normally liquid hydrocarbons and normally gaseous components. This separation is accomplished by first separating the product effluent in a first separation zone maintained under an elevated temperature and substantially the same pressure as the hydroprocessing reaction zone. Typical hydroprocessing reaction zone conditions include a temperature of about 600° to about 950° F. and a pressure of about 1,000 psig to about 3,500 psig. Further, the first separation zone is preferably maintained at a temperature below about 850° F. and particularly from about 700° to about 800° F. Produced in this first separation zone is a first liquid phase and a first vapor phase. This vapor phase produced in the first separation zone is then cooled at substantially the same pressure as the first separation zone to a temperature of about 50° to about 200° F. and preferably to a temperature of about 75° to about 150° F. This cooled vapor phase is then separated in a second separation zone maintained at substantially the same pressure as the first separation zone, and to produce a hydrogen rich, second vapor phase and a second liquid phase. To insure a second vapor phase of at least 80 percent hydrogen purity, by volume, the second liquid phase is further separated at a substantially reduced pressure and at least a portion of the resultant liquid phase is recycled back to, and commingled with, the cooled vapor phase passed to the second separation zone. This recycle liquid serves to "scrub-out" some of the impurities that would otherwise be in the second vapor phase. At least a portion of the first liquid phase produced in the first separation zone is cooled to a temperature of about 50° to about 300° F. and preferably from about 75° to about 150° F. and at substantially the same pressure as the first separation zone. This cooled first liquid phase is then separated in a third separation zone at substantially the same pressure as the first separation zone, to produce a hydrogen rich, third vapor phase and a third liquid phase. If desired, this third liquid phase may be separated in a fourth separation zone maintained under substantially the same temperature as the third separation zone but under a substantially reduced pressure to produce a fourth liquid phase containing normally liquid hydrocarbons and a fourth vapor phase containing normally gaseous components. Particularly preferred hydroprocessing reactions include hydrocracking or hydrotreating of either a distillate, boiling within a range of about 400° to about 1,100° F., or a petroleum based residuum having at least 10 percent by volume boiling about 1,050° F.

In a particularly preferred, more limited embodiment, the present invention involves a process for catalytically hydrocracking a hydrocarbon charge stock boiling above about 400° F. by a combination of several steps. The hydrocarbon is first contacted in a catalytic hydrocracking zone with hydrogen, at least a portion of which has been supplied by a particular hydrogen recycle stream, and a hydrocracking catalyst at hydrocracking conditions. These hydrocracking conditions include a pressure of about 1,000 psig to about 3,500 psig, a temperature of about 600° to about 950° F., and a hydrogen to hydrocarbon ratio of about 500 SCF/BBL to 50,000 SCF/BBL. The resultant hydrocracking zone effluent is separated in a first separation zone maintained under an elevated temperature and substantially the same pressure as the hydrocracking reaction zone, to produce a first liquid phase and a first vapor phase. Preferably, this first separation zone is maintained at a temperature below about 850° F. and particularly a temperature of about 700° to about 800° F. The vapor phase from this first separation zone is cooled to a temperature of about 75° to about 150° F. and then separated in a second separation zone maintained at substantially the same pressure as the first separation zone, to produce a hydrogen rich, second vapor phase and a second liquid phase. At least a portion of the first liquid phase is cooled to a temperature of about 50° to about 300° F. and then separated at substantially the same pressure as the first separation zone in a third separation zone, to produce a hydrogen rich, third vapor phase and a third liquid phase. At least a portion of the hydrogen rich, second vapor phase and at least a portion of the hydrogen rich, third vapor phase are recycled, as the aforementioned hydrogen recycle, to the catalytic hydrocracking zone. Preferred charge stocks include a distillate boiling within the range of 400° to about 1,100° F., or a residuum having at least 10 percent by volume boiling above 1,050° F. In this hydrocracking embodiment, the third liquid phase can be further separated in a fourth separation zone maintained at substantially the same temperature as the third separation zone, but under a substantially reduced pressure to produce a fourth liquid phase and a fourth vapor phase. Typically, the fourth liquid phase contains normally liquid hydrocarbons, either as produced during the reaction or those hydrocarbons unconverted in the reaction. The fourth vapor phase contains normally gaseous compounds such as methane, ethane and propane as well as any hydrogen sulfide or ammonia which is produced by impurities in the hydrocarbon charge stock.

Further objects and embodiments and a more detailed description of the foregoing embodiments will be found in the following, more detailed description of the process of the present invention.

DETAILED DESCRIPTION OF THE INVENTION

The separation process of the present invention is applicable to any process wherein hydrogen is utilized in considerable quantities at high temperatures and high pressures wherein there is produced a gas-liquid, mixed phase effluent and whether of a hydrogen consuming or hydrogen producing nature. The process of the present invention is particularly applicable wherein a normally liquid hydrocarbon charge stock is hydroprocessed at elevated temperatures and elevated pressure so as to produce a gas-liquid, mixed phase system containing normally liquid hydrocarbons, hydrogen and normally gaseous compounds. As used herein, hydroprocessing refers to any processing of a hydrocarbon or petroleum fraction under elevated pressure involving a consumption of hydrogen by the hydrocarbon or petroleum fraction. Further, the terms "elevated temperature," "elevated pressure," "relatively high temperature" and "relatively high pressure," as used herein, connote pressures in excess of about 1,000 psig and particularly pressures in the range of about 1,000 psig to about 3,500 psig, and temperatures in excess of about 600° F and particularly temperatures in the range of about 700° to about 950° F.

Thus hydrocracking involving a substantial reduction (i.e., 50 percent or more) in the molecular size of the hydrocarbon charge with consumption of hydrogen in the range of 1,000 to 3,000 SCF/BBL (standard cubic feet per barrel) of feed; hydrotreating involving removal of impurities such as sulfur and nitrogen with little molecular rearrangement or size reduction; or, hydrorefining involving hydrotreating and a minor part (i.e., 10 percent or less) of hydrocracking, are all included within the generally broad term "hydroprocessing" as utilized in the present invention. However, this invention is particularly suited to hydrocracking operations.

Hydrocarbons applicable within the scope of the present invention vary widely and include a relatively pure hydrocarbon species, a mixture of hydrocarbons, or an impurity containing hydrocarbon or mixture of hydrocarbons. The separation process of the present invention is particularly suitable for those hydrocarbon systems possessing a high solubility for hydrogen at elevated temperatures and pressures. Thus, high pressure, high temperature isomerization reactions such as those involving alkyl aromatics (i.e., $C_8$ aromatics) or low molecular weight paraffinic hydrocarbons (i.e., $C_4$-$C_7$ alkanes) are included within the generally broad scope of the present invention.

The present invention is particularly suited to a hydrocracking operation and applies to the hydrocracking of either petroleum or coal based hydrocarbon stocks. Particularly preferred are hydrocarbon charge stocks boiling above about 400° F. whether of a distillate or residual character such as a distillate boiling within the range of about 400° to about 1,100° F., or a residual stock having at least 10 percent by volume boiling above 1,050° F. The present invention is particularly suited to the conversion of heavy carbonaceous materials broadly classified as black oils, particularly the heavy black oils extracted from tar sands, topped or reduced crudes, residium, etc. These black oils typically contain considerable quantities of sulfurous compounds, nitrogenous compounds, high molecular weight organic metallic complexes such as nickel and vanadium complexes and a considerable amount of asphaltic material. A typical black oil is characterized by having more than 10 percent by volume boiling above a temperature of about 1,050° F. and often more than 50 percent, by volume, boiling over about 1,050° F.

Specific examples of black oils which, when hydroprocessed, produce a gas-liquid, mixed phase system, include vacuum tower bottoms having a gravity of 7.1° API at 60° F. and containing 4.1 percent by weight sulfur and 23.7 percent by weight asphaltic material; a topped middle east Kuwait crude oil having a gravity of 11.0° API at 60° F. and containing about 5.2 percent by weight sulfur and 10.1 percent by weight asphaltic material; and a vacuum residium having a gravity of 8.8° API at 60° F., containing 3 percent by weight of sulfur and 0.43 percent nitrogen and having a 20 percent volumetric distillation point of 1,055° F. Unless converted to lower boiling hydrocarbons, these materials are used only as road asphalts or extremely low grade fuel.

The hydroprocessing of hydrocarbon charge stocks of the type mentioned will be described in detail herein in relation to a hydrocracking type operation. However, hydrotreating and hydrorefining operations such as distillate or residuum desulfurization are included within the broad scope of this invention, and no intention to limit the scope of the present invention is to be implied by confining the present discussion to the hydrocracking operation. In a typical hydrocracking operation, a hydrocarbon charge stock boiling above 400° F. is catalytically hydrocracked in a catalytic hydrocracking zone by contacting the charge stock with hydrogen and a hydrocracking catalyst at hydrocracking conditions. The hydrogen is utilized at a hydrogen to hydrocarbon ratio of about 500 SCF/BBL to 50,000 SCF/BBL. At least a portion of this hydrogen is supplied by recovering hydrogen from the mixed-phase hydrocracking product effluent and recycling the hydrogen back to the hydrocracking zone. Hydrocracking conditions also include a pressure of about 1,000 psig to about 3,500 psig and a temperature of about 600° to about 950° F. Further, the hydrocarbon charge contacts the catalyst at a liquid hourly space velocity (defined as volume of liquid hydrocarbon charge per hour as measured at 60° F. per volume of catalyst within the reaction zone) of about 0.1 hr.$^{-1}$ to about 10 hrs.$^{-1}$. The exact hydrocracking conditions are a function of the feedstock processed and products desired and are readily manipulated in a manner well known to those trained in the art.

The catalytic hydrocracking may be effected in any suitable manner known to those trained in the art, and may comprise either a batch or continuous type operation. The preferred manner utilizes a continuous type operation wherein a hydrocracking catalyst is disposed as a fixed bed in the hydrocracking zone. The hydrocarbon feed stock and hydrogen are continuously charged in the conversion zone and are contacted with the catalyst in either an upward, downward or radial flow fashion. This hydrocracking operation may also be effected in a moving bed operation, an ebbulating bed operation, or in a hydrocarbon-catalyst suspension type operation in which a catalyst and hydrocarbons are commingled and passed through the reaction zone as a slurry. A preferred method of operation is a fixed-bed, downflow system.

A preferred method of effecting a hydrocracking operation comprises raising the liquid hydrocarbon charge to a temperature just below the incipient level of thermocracking, and preferably, to a temperature within a range of about 700° to about 800° F. In a separate heater, the hydrogen required is heated to a temperature above that at which thermocracking of hydrocarbons occurs. For example, the hydrogen will be separately heated to a temperature within the range of about 900° to about 1,000° F. or higher. The thus separately heated streams are then admixed prior to the introduction to the reaction chamber. A particularly preferred method comprises introducing the separately heated streams into a common mixer-header wherein sufficient turbulence is generated to assure thorough contact and complete heat exchange between the two streams prior to introduction to the hydrocracking zone.

The exact catalytic composite to be utilized in a catalytic hydroprocessing reaction, such as hydrocracking, is, as in the case of the conversion conditions, a function of the particular reaction products desired and feedstock utilized. Generally, however, these catalysts can be characterized as comprising a metallic component having hydrogenation activity, which catalytic component is usually composited within a refractory inorganic oxide material of either synthetic or natural origin. When effecting a hydrocracking operation, it is preferred to utilize a refractory inorganic oxide of acidic nature. However, while it is preferred to utilize such conversion catalysts where a metallic component is combined with a carrier material, it is also within the scope of the present invention to include situations where a metallic component is unsupported, such as in the previously mentioned slurry operation.

Suitable metallic components having hydrogenation activity are those selected from Groups VIB and VIII of the Periodic Table of Elements. Thus, a catalytic o composite may comprise one or more metallic components selected from the group of chromium, molybdenum, tungsten (wolfram), iron, cobalt, nickel, ruthenium, rhodium, palladium, osmium, iridium, and platinum. The concentration of the catalytically active metallic component or components is primarily dependent upon the particular metal involved, process utilization and characteristics of the hydrocarbon charge stock. In general, the metallic components of Group VIB are preferably present in amounts within the range of about 1 to about 50 percent by weight, the iron group metals of Group VIII in an amount within the range of about 0.2 to about 10 percent by weight, whereas the platinum group metals are preferably present in an amount within the range of 0.1 to about 5 percent by weight, all of which are calculated as if the components existed as the elemental metal.

Refractory inorganic oxide carrier materials may comprise alumina, silica, zirconia, magnesia, titania, boria, strontia, hafnia, etc; the crystalline aluminosilicates such as mordenite, faujasite, etc., and mixtures of two or more of these materials including silica-alumina, silica-zirconia, alumina-mordenite, alumina-silica-faujasite, and the like. The precise composition and method of manufacturing of the carrier material is not essential to the present invention. Preferred carrier materials include faujasite and those carriers containing at least a portion of silica and, preferably, a composite of alumina and silica containing a greater proportion of alumina. Particularly preferred is a catalyst comprising about 2 to about 10 percent by weight, nickel on a faujasite base.

The effluent product from a given high temperature, high pressure hydroprocessing reaction zone resulting from the conversion of a liquid hydrocarbon charge stock of the type described is characterized as a gas-liquid, mixed phase system containing hydrogen, normally liquid hydrocarbons, and normally gaseous compounds. As used herein, "normally" refers to typical ambient temperatures and pressures and thus, the gaseous compounds typically include methane, ethane, propane, ammonia, hydrogen sulfide and the like. Further, the liquid hydrocarbon contains appreciably hydrogen in solution. The essence of the present invention lies in separating the maximum amount of hydrogen in high purity, such as purities suitable for recycle, (i.e., purities of at least 80 percent by volume, and preferably at least 90 percent by volume purity) from this mixed-phase system.

This desired separation is performed by passing the effluent to a first separation zone maintained at substantially the same pressure as the reaction zone and under an elevated temperature to provide a first liquid phase and a first vapor phase. This separation zone, as well as the other separation zones mentioned herein, are conventional separation zones for the separation of vapor-liquid systems and typically comprise a vessel wherein a lower liquid level is maintained and the vapors, after passing through a demister pad are removed overhead. As used herein, "substantially the same pressure" is intended to mean that the pressure imposed upon a particular zone is substantially the same as the preceding upstream zone made mention, allowing a pressure differential only for the normal pressure drop resulting from fluid flow through a system (i.e., pipes, heat exchanges, etc.). Similarly, "substantially the same temperature" indicates that any temperature loss is due to normal flow losses or from the conversion of sensible heat to latent heat by "flashing" where a pressure drop occurs. In this first separation zone, an elevated temperature refers to a temperature in the same 600°-950° F. range previously mentioned but is not necessarily the same temperature as the reaction zone effluent. Thus, the effluent may be cooled to a temperature within this given elevated range. In fact, it is preferred that the material entering the first separator be below 850° F. and particularly a temperature of about 700° to about 800° F. since in a typical heavy hydrocarbon charge, such as a 400°+ F., boiling material, will contain nitrogenous impurities which in hydroprocessing are converted, at least in part, to ammonium salts which at temperatures above about 700° F. tend to fall in the liquid phase. Temperatures in excess of 850° F. may allow excessive amounts of normally liquid hydrocarbons to be removed from the first liquid phase and pass to the first vapor phase.

The vapor phase from the first separation zone is cooled at substantially the same pressure as the first separation zone to a temperature of about 50° to about 200° F. and preferably a temperature of about 75° to about 150° F. This cooled product is separated at substantially the same pressure as the first separation zone to provide a hydrogen rich, second vapor phase and a second liquid phase. This second vapor phase contains at least 80 percent, by volume, hydrogen which is suitable for recycle. The second liquid phase contains normally liquid hydrocarbons (typically at least 80 percent by volume of this liquid phase) contained in the vapor from the first separation zone, hydrogen sulfide (from sulfur in the feed) and a small amount of hydrogen. Depending on the exact hydroprocessing reaction effected, to maintain a high hydrogen purity in the second vapor phase, the second liquid phase is separated at a substantially reduced pressure and at least a portion of the resultant liquid produced is recycled to the second separation zone, to help remove impurities from the hydrogen. This recycle is important where the first vapor phase contains considerable impurities such as in black oil hydrocracking.

At least a portion of the first liquid phase is cooled at substantially the same pressure as the first separation zone to a temperature of about 50° to about 300° F. and preferably a temperature of about 75° F. to about 150° F. The thus cooled liquid product is then separated at substantially the same pressure as the first separation zone to remove the hydrogen contained in solution in the liquid and to provide a hydrogen rich, third vapor phase, and a third liquid phase. This hydrogen rich, third vapor phase is produced by the hydrogen leaving solution as the hydrocarbon liquid is being cooled and is relatively pure, i.e., a purity of at least 80 percent by volume hydrogen and often extending up to 90 percent purity when the liquid is cooled to a temperature below about 250° F. Further, this hydrogen recovered in high purity represents the majority of the hydrogen in solution in the first liquid phase. For example, in a first liquid phase from a black oil hydrocracking operation effected at about 2,700 psig, the vapor removed by cooling this liquid to about 300° F. will contain about 75 percent of the hydrogen in solution and at a purity of greater than 85 percent. In general, cooling to a lower temperature produces increased purities and increased recoveries. In a typical hydroprocessing reaction such as hydrocracking, at least a portion of the hydrogen rich second vapor phase and at least a portion of the hydrogen rich third vapor phase are recycled back to the conversion zone. Since these hydrogen rich phases are at substantially the same pressure as the hydroprocessing zone (i.e., only pressure differential is due to flow pressure drop) only slight recompression is required. Further recovery and recycle of the hydrogen lowers the amount of make-up hydrogen required in the total hydroprocessing scheme.

To facilitate further product recovery, the third liquid phase is further separated in a fourth separation zone maintained in substantially the same temperature range as described for the third separation zone, and preferably at a temperature of about 75° to about 150° F. and under a substantially reduced pressure. This separation provides a fourth liquid phase containing normally liquid hydrocarbons and a fourth vapor phase containing normally gaseous compounds and typically contains the majority of the methane, ethane and propane contained in the original product effluent. The fourth liquid phase is then fractionated by means well known to those trained in the art to complete the product recovery. As used herein, "substantially reduced pressure" is intended to connote a pressure range of subatmospheric up to 200 psig and particularly, a pressure of about 100 to about 200 psig.

DESCRIPTION OF THE DRAWING

The process of the present invention can be more clearly described by reference to the attached drawing, schematically illustrating a black oil type hydrocracking operation. Of necessity, certain limitations must be present in a diagram of the type presented and no intention is made thereby to limit the scope of this invention to particular reactants, concentrations, weights, operating conditions, catalysts, etc. Miscellaneous appurtenances including some valves, pumps, compressors, separators, reboilers and the like have been eliminated. Only those vessels and lines necessary for a complete and clear understanding of the process of the present invention are illustrated. Any obvious modifications made by those possessing expertise in the art of hydroprocessing are included within the generally broad scope of the invention.

Referring now to the appended schematic diagram, make-up hydrogen enters the process via line 1 and is commingled with heated hydrogen recycle stream 2, the source of which is to be described later. This combined hydrogen stream passes through line 2 and is commingled with heated charge stock entering via line 3. This charge stock has been heated to a temperature below the incipient level of cracking and particularly to a temperature of about 750° F. in a manner to be described later. Further, the hydrogen in line 2 is at a temperature sufficiently high so that when the hydrogen and feedstock are admixed, a reactor inlet temperature of about 775° F. results. This hydrogen-charge stock mixture is passed via line 4 to hydrocracking reactor 5, wherein the charge stock is converted to saturated, lower boiling products. More particularly the charge stock is a vacuum tower bottoms having a normal boiling point of about 1,030° F. and an API gravity at 60° F. of about 13.3. Hydrocracking reactor 5 is maintained under a pressure of about 2,700 psig. Further, hydrocracking zone 5 contains a fixed bed of hydrocracking catalyst with which the hydrocarbon feed and hydrogen are contacted in a downflow fashion at 0.5 hrs.$^{-1}$ hydrocarbon LHSV. Preferably, the hydrogen in lines 1 and 2 are combined with the charge stock entering via line 3 to provide a total hydrogen to hydrocarbon ratio of about 8,000 SCF/BBL.

The reaction product from hydrocracking reactor 5 is removed from the reactor at a temperature of about 825° F. via line 6, is cooled by heat exchange means 7 to a temperature of about 750° F. and is then passed to separation zone 8. Separation zone 8 is maintained at a temperature of about 750° F. and a pressure of about 2,675 psig. This pressure differential between reaction zone 5 and separator 8 is due solely to the pressure drop associated with the flow through line 6 and heat exchange means 7. Removed, via line 15, from separation zone 8 is a liquid phase containing appreciable amounts of dissolved hydrogen. This liquid phase is cooled by indirect heat exchange, in heat exchange means 16, with fresh charge stock entering via line 17, and is further cooled by heat exchange means 19 to a temperature of about 125° F. Further, at least a portion of this liquid phase may be recycled back to reactor 5 prior to cooling, by means not shown. This first liquid phase is then separated in separation zone 20 which is maintained at a temperature of about 1,25° F. and a pressure of about 2,655 psig. This pressure differential between separation zone 20 and separation zone 8 is due to the pressure drop associated with flow through line 15, heat exchange means 16 and heat exchange means 19. Removed overhead from separation zone 20 is hydrogen recycle stream 21 which contains about 79.5 percent of the hydrogen contained in the liquid phase removed from separation zone 8 and at a hydrogen purity greater than 92 percent by volume. Removed via line 25 from separation zone 20 is a liquid phase which is passed to separation zone 26 which is maintained at a pressure of about 200 psig and a temperature of about 100° F. Within this separation zone 26, the normally gaseous compounds present in the effluent from reactor 5 such as methane, ethane, propane, hydrogen sulfide, ammonia and the like, are removed as light ends via line 27. The liquid phase produced in separation zone 26 is removed via line 28 for further fractionation and product recovery by means well known to those trained in the art.

The vapor phase removed via line 9 from separation zone 8 is cooled by indirect heat exchange, with fresh charge stock, in heat exchange means 10 with the same fresh charge stock that has already been utilized to cool the liquid phase from separation zone 8. This charge stock is then further heated in heater 18 and passed via line 3 to hydrocracking zone 5 as previously indicated. This cooled vapor overhead from separation zone 8 is then further cooled in heat exchange means 11 to a temperature of about 100° F. and is passed via line 9 to separation zone 12. Separation zone 12 is maintained at a pressure of about 2,655 psig and a temperature of about 100° F. In this separation zone 12, normally liquid hydrocarbons present in the vapor phase removed from separator 8 are condensed and removed as a liquid phase via line 14. Removed overhead from separation zone 12 via line 13 is a hydrogen recycle stream containing hydrogen at a minimum of 80 percent purity. This purity is maintained by passing the liquid phase in line 14 to separation zone 29 maintained at a pressure of about 200 psig wherein the liquid is flashed. At least a portion of the resultant liquid is then recycled via line 31 to separation zone 12. The remaining liquid and the vapor produced in separation zone 29 are removed via lines 32 and 30 respectively. Hydrogen recycle stream 13 is then combined with the hydrogen in recycle stream 21 and passed via line 13 to compression means 22. Compression means 22 compresses the hydrogen back to the pressure of hydrocracking zone 5 and is removed from the compressor via line 23 and passed to heater 24 for elevation to a temperature sufficient to raise the hydrocarbon charge stock to a temperature of 775° F., when commingled therewith, as previously described.

From the foregoing description of the process of the present invention, it is seen that a method for separating and recovering hydrogen in high purity suitable for recycle to a hydroprocessing zone is accomplished with minimum hydrogen losses. Further, this hydrogen is not only recovered at a high purity but is also recovered at a pressure substantially the same as the pressure in the reaction zone to which the hydrogen is to be recycled. Thus, the present invention offers a more efficient, economical process for separating the gas-liquid, mixed phase effluent from a high temperature, high pressure hydroprocessing reaction. By recovering additional amounts of hydrogen at high purity and high pressure, the make-up hydrogen requirements are lowered, both as to volume make-up and the compression costs associated therewith.

I claim as my invention:

1. A process for separating a high temperature, high pressure hydroprocessing reaction zone product effluent resulting from the conversion of a liquid hydrocarbon charge stock, said product effluent characterized as a gas-liquid, mixed phase system containing hydrogen, normally liquid hydrocarbons and normally gaseous compounds, which comprises the steps of:
   i. separating said effluent in a first separation zone maintained under an elevated temperature and substantially the same pressure as said reaction zone to provide a first liquid phase and a first vapor phase;
   ii. cooling said vapor phase from said first separation zone at substantially the same pressure as said first separation zone to a temperature of about 50° to about 200° F. to produce a first cooled product;
   iii. separating said first cooled product from step (ii) in a second separation zone at substantially the same pressure as said first separation zone to provide a hydrogen rich, second vapor phase and a second liquid phase;
   iv. cooling at least a portion of said first liquid phase at substantially the same pressure as said first separation zone to a temperature of about 50° to about 300° F. to produce a second cooled product; and,
   v. separating said second cooled product from step (iv) at substantially the same pressure as said first separation zone in a third separation zone to provide a hydrogen rich, third vapor phase and a third liquid phase.

2. The process of claim 1 wherein said first vapor phase in step (ii) is cooled to a temperature of about 75° to about 159° F.

3. The process of claim 1 wherein said first liquid phase in step (iv) is cooled to a temperature of about 75° to about 150° F.

4. The process of claim 1 wherein said first separation zone of step (i) is maintained at a temperature below about 850° F.

5. The process of claim 4 wherein said temperature is about 700° to about 800° F.

6. The process of claim 1 wherein said third liquid phase of step (v) is separated in a fourth separation zone at substantially the same temperature as said third separation zone and under a substantially reduced pressure to provide a fourth liquid phase containing normally liquid hydrocarbons and a fourth vapor phase containing normally gaseous compounds.

7. The process of claim 1 wherein said hydroprocessing is effected at a temperature of about 600° to about 950° F. and a pressure of about 1,000 psig to about 3,500 psig.

8. The process of claim 1 wherein said charge stock is a distillate boiling within the range of about 400° to about 1,100° F.

9. The process of claim 1 wherein said charge stock is a petroleum based residuum having at least 10 percent by volume boiling above 1,050° F.

10. A process for catalytically hydrocracking a hydrocarbon charge stock boiling above about 400° F. which comprises the steps of:
    i. contacting, in a catalytic hydrocracking zone said charge stock with hydrogen, at least a portion of which hydrogen is supplied by a hereinafter described hydrogen recycle, and a hydrocracking catalyst at hydrocracking conditions including a pressure of about 1,000 psig to about 3,500 psig, a temperature of about 600° to about 950° F., and a hydrogen to hydrocarbon ratio of about 500 SCF/BBL to 50,000 SCF/BBL;
    ii. separating the resultant hydrocracking zone effluent in a first separation zone maintained under an elevated temperature and substantially the same pressure as said reaction zone to provide a first liquid phase and a first vapor phase;
    iii. cooling said vapor phase from said first separation zone at substantially the same pressure as said first separation zone to a temperature of about 75° to about 150° F. to produce a first cooled product;
    iv. separating said first cooled product from step (iii) in a second separation zone at substantially the same pressure as said first separation zone to provide a hydrogen rich, second vapor phase and a second liquid phase;
    v. cooling at least a portion of said first liquid phase at substantially the same pressure as said first separation zone to a temperature of about 50° to about 300° F. to produce a second cooled product.
    vi. separating said second cooled product from step (v) at substantially the same pressure as said first separation zone in a third separation zone to provide a hydrogen rich, third vapor phase and a third liquid phase; and,
    vii. recycling at least a portion of said hydrogen rich second vapor phase of step (iv) and at least a portion of said hydrogen rich, third vapor phase of step (vi) as said hydrogen recycle to said hydrocracking zone of step (i).

11. The process of claim 10 wherein said first separation zone of step (ii) is maintained at a temperature below about 850° F.

12. The process of claim 11 wherein said temperature is about 700° to about 800° F.

13. The process of claim 10 wherein said third liquid phase of step (vi) is separated in a fourth separation zone at substantially the same temperature as said third separation zone and under a substantially reduced pressure to provide a fourth liquid phase containing normally liquid hydrocarbons and a fourth vapor phase containing normally gaseous compounds.

14. The process of claim 10 wherein said charge stock is a distillate boiling within the range of 400° to about 1,100° F.

15. The process of claim 10 wherein said charge stock is a petroleum based residuum having at least 10 percent by volume boiling about 1,050° F.

* * * * *